Feb. 12, 1929.
W. L. WALKER
HOSE COUPLING
Original Filed Aug. 14, 1920   3 Sheets-Sheet 1
1,701,829
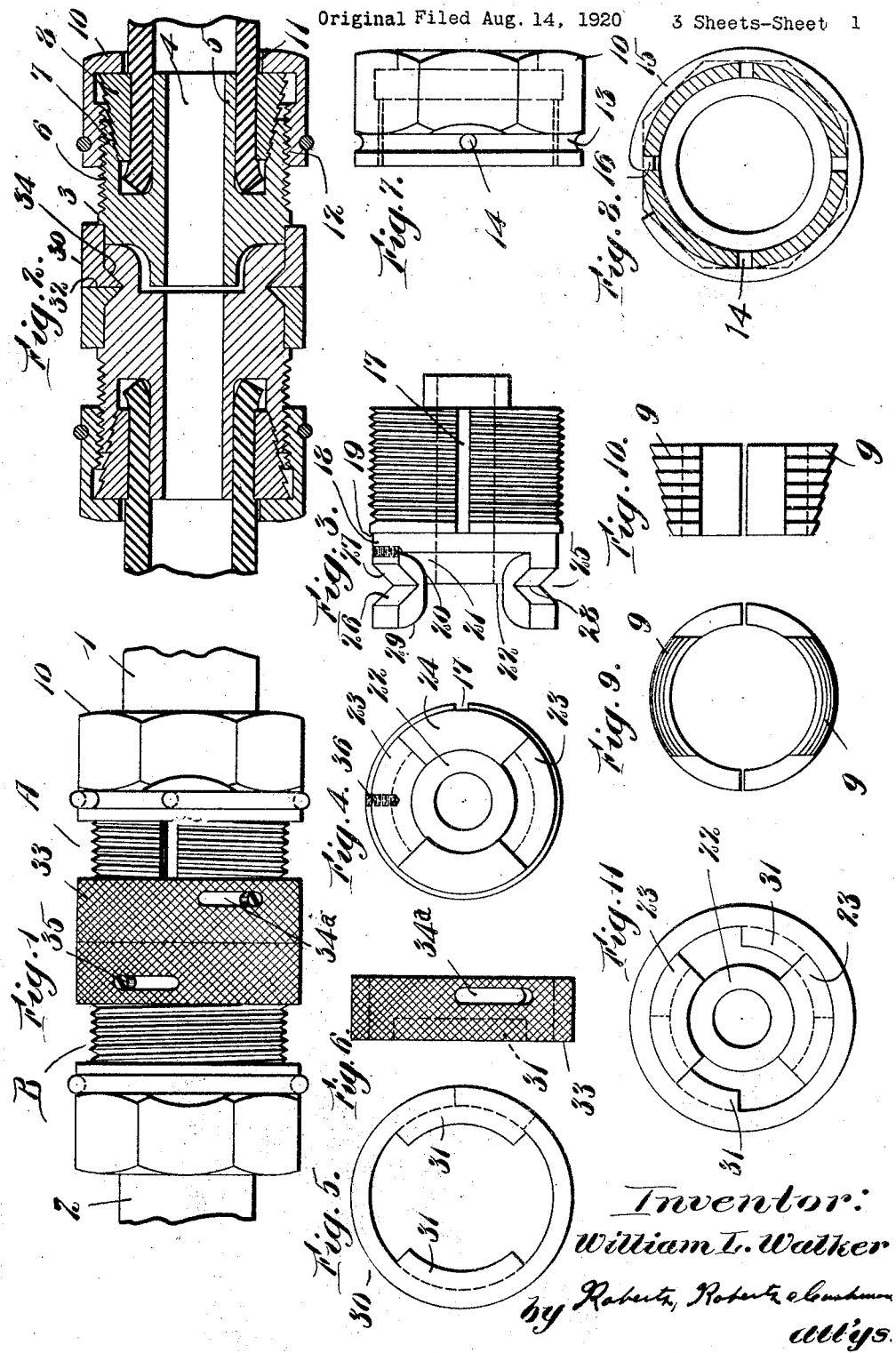
Inventor:
William L. Walker
by Roberts, Roberts & Cushman
attys.

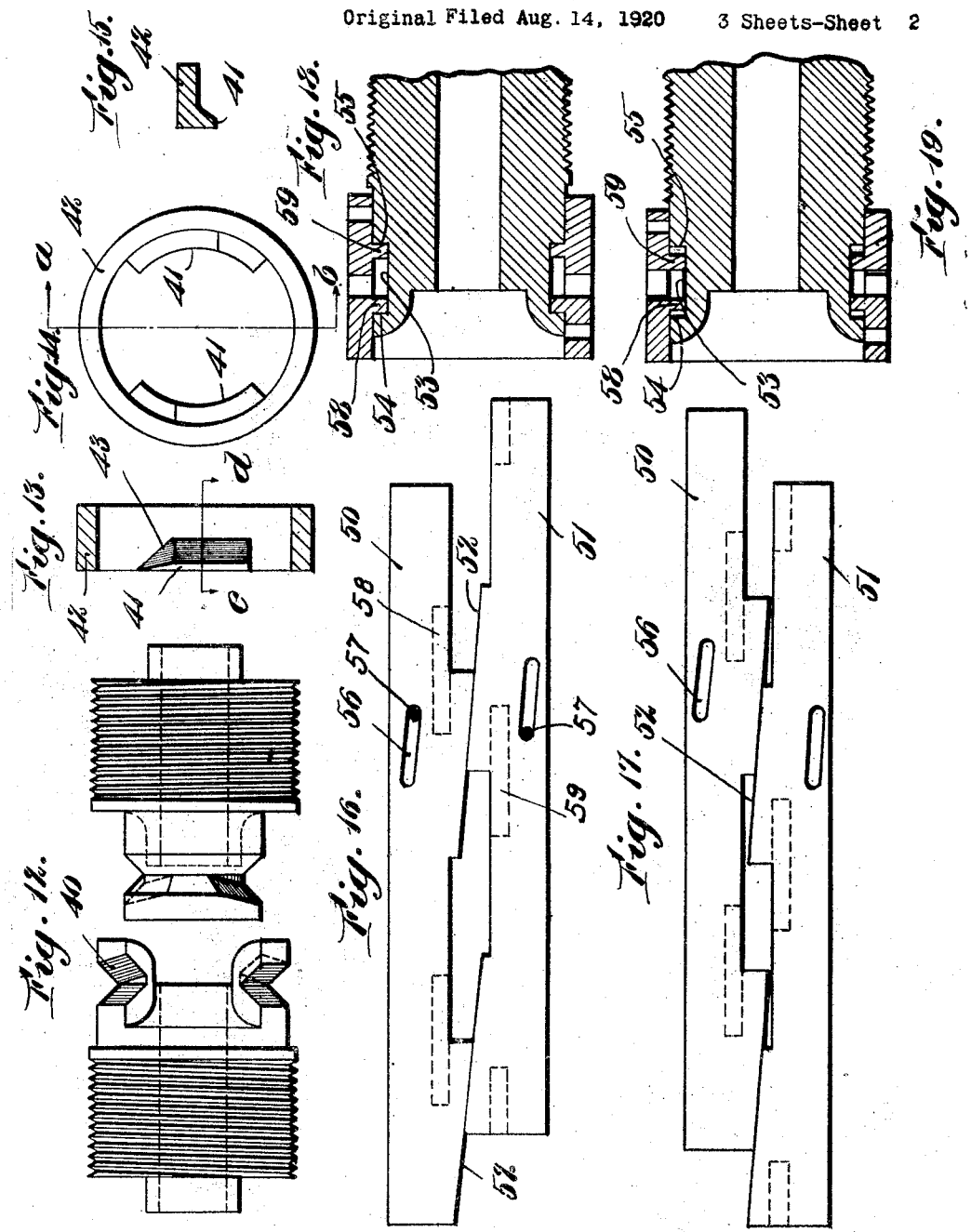

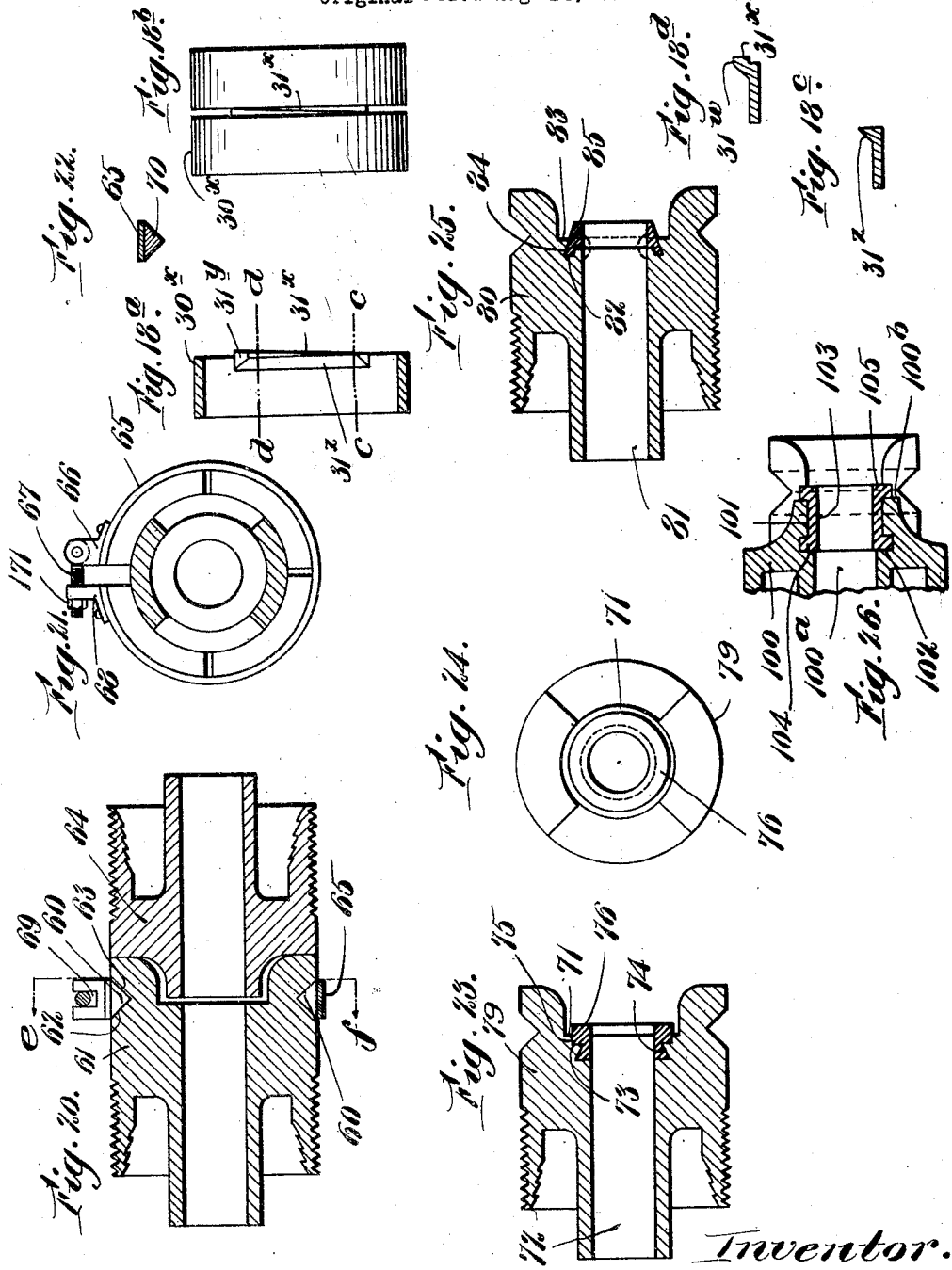

Patented Feb. 12, 1929.

1,701,829

UNITED STATES PATENT OFFICE.

WILLIAM L. WALKER, OF NEW YORK, N. Y.

HOSE COUPLING.

Application filed August 14, 1920, Serial No. 403,457. Renewed April 10, 1928.

This invention relates to hose couplings and more particularly to couplings for air conveying hose such as employed in connection with the operation of pneumatic tools, although it is contemplated that the device of the present application will be applicable in all cases where it is desired to provide for the ready connection and disconnection of tubular conduits.

Couplings of the type indicated, as commonly designed, employ complemental parts having internally and externally threaded portions, respectively. Such a threaded part, particularly that having the external thread, is easily damaged by rough usage to an extent rendering it difficult if not impossible to properly engage it with its mating element thus causing delay and annoyance and wasting the time of the user.

One object of the present invention is to overcome such defects as are found in prior devices as indicated above, and to this end it is proposed to provide a structure in which the employment of screw threads for holding the complemental parts of the coupling in engaging relation is dispensed with.

One mode of accomplishing this result may consist in the provision of one or more lugs projecting axially from the end of one or both of the complemental coupling elements and arranged to be seated in corresponding sockets in the other of said elements, together with a coupling member associated with both elements and arranged to be moved into clamping relation to said lug or lugs. Such a lug may if desired be provided with a circumferential groove, and the clamping member may conveniently be the form of a ring having a segmental flange which by a partial rotation of the ring may be caused to seat in said groove. Under some circumstances it may further be desirable to form said flange with an inclined or wedge surface whereby a slight relative axial movement of the ring and lug is produced by the rotation of the ring, such axial movement serving to draw the parts more closely together in an axial direction.

In couplings as commonly devised and in which complemental parts are provided with internal and external threads respectively, it is necessary in connecting two lengths of conduit that an end having an externally threaded coupling element shall be brought into juxtaposition with one having an internally threaded element. This usually requires the use of two wrenches which, if mislaid, causes annoyance and a serious loss of time. Furthermore, it is often desirable to connect two different sizes of conduit together, which is impossible in couplings as commonly designed, but which can readily be done with this coupling device provided there is not too great a difference in the size of the conduit used.

A further object of the present invention is to provide a coupling device in which the separable coupling elements shall be so designed that it may be possible to attach any two adjacent ends of conduit indiscriminately. To this end it is proposed to make the separable coupling elements substantial duplicates one of the other, each coupling element preferably having one or more lugs and complemental sockets, and each element also having a clamping device of substantially identical construction. According to one arrangement the coupling elements may each have a pair of diametrally opposed lugs each extending through substantially a quadrant of arc with a pair of socket openings of similar extent between them, the lugs and sockets of each coupling element being of substantially like shape and size. Such a construction permits the ready interengagement of the two pairs of lugs and sockets while the employment of a clamp member with each coupling element insures against accidental separation of the parts. As further contributing to this latter end, the clamping elements may take the form of rings as above referred to, such rings being arranged for partial rotation in relatively opposite directions to bring them into clamping position. In devices of this character it is very desirable that the operation of coupling lengths of conduit require no tools and little time, but that it shall at the same time be strong and reliable. The present invention therefore has for a further object the provision of a coupling in which the connection and disconnection of the separable parts shall be readily and quickly accomplished by the hands of the user and which shall also serve to retain the parts securely and closely in operative relation. To this end the coupling may be arranged as above described with interengaging lugs and sockets together with a pair of oppositely rotatable clamping rings, each ring having a pair of segmental flanges adapted to engage corresponding circumferential grooves in the lugs, such engagement being accomplished by an eighth revolution, more or less, of the two rings in opposite directions.

Coupling devices of the character described are frequently employed for connecting lengths of conduit through which fluid passes under high pressure and as commonly constructed such couplings frequently cause great annoyance through leakage at the point of connection.

A further object of this invention is to overcome such defect in prior couplings whereby to avoid loss of fluid and reduction of pressure in the conduit. To this end each coupling element may be provided with a compressible elastic member preferably in the form of a washer so arranged relative to adjacent parts that it is brought into closer contacting relation with the opposed washer by increase in fluid pressure within the conduit thus effectively sealing the coupling joint against leakage.

Fig. 1 is a side elevation of the complete coupling the parts being locked in position of use;

Fig. 2 is a longitudinal cross-section of the parts shown in Fig. 1;

Fig. 3 is a side elevation of one of the separable coupling elements;

Fig. 4 is an end elevation taken from the left-hand side of Fig. 3;

Fig. 5 is an end elevation of one of the rotatable locking rings employed;

Fig. 6 is a side elevation of the ring shown in Fig. 5;

Fig. 7 is a side elevation of a hose clamping cap used with the coupling;

Fig. 8 is an end elevation of the device shown in Fig. 7 illustrating the employment of a novel form of nut lock therewith;

Fig. 9 is an end elevation of the device shown in Fig. 10;

Fig. 10 is a side elevation illustrating two wedge clamping elements employed in connecting a hose to the device shown in Fig. 3;

Fig. 11 is an end elevation of the device shown in Fig. 3 with the locking ring mounted thereon;

Fig. 12 is a side elevation illustrating separable coupling elements of a modified construction;

Fig. 13 is a section on the line $a$—$b$ of Fig. 14, illustrating a locking ring employed with the form of coupling shown in Fig. 12;

Fig. 14 is an end elevation of the ring shown in Fig. 13;

Fig. 15 is a cross-section on the line $c$—$d$ of Fig. 13 showing the locking cam in section;

Fig. 16 is a development of a pair of locking rings of modified form in which the rings are provided with engageable cam faces, the parts being shown in locked position;

Fig. 17 is a view similar to Fig. 16 but showing the rings in unlocked position;

Figs. 18 and 19 are longitudinal cross-sections through one of the separable coupling elements showing locking rings of the type illustrated in Figs. 16 and 17 associated therewith. The position of the parts in these figures corresponds to that shown in Figs. 16 and 17 respectively;

Fig. 18$^a$ is a diametral cross-section of a modified and preferred form of the clamping ring shown in Fig. 14;

Fig. 18$^b$ is a side elevation illustrating the cooperation of two clamping rings such as shown in Fig. 18$^a$;

Fig. 18$^c$ is a cross section on the line $c$—$c$ of Fig. 18$^a$;

Fig. 18$^d$ is a cross-section on the line $d$—$d$ of Fig. 18$^a$;

Fig. 20 is a longitudinal cross-section through a pair of separable coupling elements illustrating a modified form of locking ring;

Fig. 21 is a section on the line $e$—$f$ of Fig. 20;

Fig. 22 is a sectional view transversely of the locking ring shown in Fig. 20;

Fig. 23 is a longitudinal section through one of the separable coupling elements illustrating an arrangement of packing ring or gasket employed therewith;

Fig. 24 is an end elevation of the parts shown in Fig. 23;

Fig. 25 is a sectional view similar to Fig. 23 and illustrating a modification of the arrangement shown therein; and Fig. 26 is a sectional view similar to Fig. 23 and illustrating a further and preferred modification of the gasket and means for holding it in position.

Referring to Fig. 1, A, B, indicate generally a pair of separable coupling elements of substantially like construction, these elements being adapted to form respectively, terminals for a pair of flexible conduits 1, 2.

Seen more clearly in Fig. 2, each of these terminals comprises a substantially cylindrical body portion 3 having a central longitudinal bore 4 arranged to form a continuation of the channel in the conduit. At one end the body portion 3 is provided with a longitudinally extending nipple 5 which may be inserted in the end of the conduit. The body portion 3 is also provided with an outwardly extending cylindrical wall 6 arranged concentrically with the nipple 5 and screw-threaded upon its exterior surface. The interior surface of said wall 6 may if desired, be provided with toothed or roughened portions 7. Cooperating with said roughened portions, wedge members 8 may be provided, such wedge members as clearly illustrated in Figs. 9, 10, being of substantially semicircular form and having roughened surfaces 9 adapted to cooperate with the surfaces 7. 10 is a cap having a central opening 11 through which the end of the conduit may be passed, said cap being screw-threaded at 12 for engagement with the screw-threads upon the outside of the wall 6.

In assembling the parts thus far described, the nipple 5 is inserted within the end of the conduit. The wedge members 8 are then positioned to substantially surround the outer end of the conduit and are pushed inwardly into engagement with the inner surface of the wall 6. The cap 10 which has previously been slipped over the end of the conduit is then moved downwardly until its screw threads engage those of the outer surface of the wall 6, whereupon the cap is rotated thus forcing the wedges 8 inwardly and securely locking the conduit in operative engagement with the member 3.

The cap 10 may be provided with a circumferential groove 13 having one or more radial openings 14 extending from the bottom of the groove through the cap. 15 is a resilient wire ring arranged to be sprung into the groove 13, and to seat within the same, this ring having at one end a lug 16 formed by bending the ring sharply in a radial direction. The wall 6 is provided with a longitudinal slot 17 extending along the threaded portion thereof, and adapted to receive the lug 16 when the latter is permitted to project through the opening 14. In screwing the cap into place the member 15 is first sprung outwardly to remove the lug 16 from the opening 14 and is then slid around in the groove 13 to a sufficient distance to prevent the lug 16 from dropping into the opening. The cap is then free to turn, but when it has been sufficiently tightened the member 15 is again moved sufficiently to permit lug 16 to pass through an opening 14 into engagement with the slot 17 thus locking the cap against rotation. It will be understood that a plurality of slots 17 may if desired be provided.

The members 3 which may for convenience be termed "conduit terminals" are of duplicate construction and it will be sufficient herein to describe but one of them in further detail.

Referring to Figs. 2, 3, and 4, it will be seen that the body portion 3 is provided at its left hand end, with a cylindrical portion 18 of reduced diameter forming a shoulder 19. Said body portion 3 terminates at its left hand extremity, as shown in Fig. 3, in a reduced cylindrical portion 20 of relatively small diameter. Said portion is flared outwardly, as seen at 21, to its junction with the surface 18. The end wall of the body portion, as seen at 22, forms a surface substantially perpendicular to its axis.

Projecting from the body portion 3 to the left, as seen in Fig. 3 are a plurality of axially extending lugs 23 of segmental form, such lugs being herein shown as integral with the body portion, although it is to be understood that they may be formed as separate elements and suitably secured thereto. These lugs are preferably symmetrically spaced about the body portion and are of an angular length substantially equal to that of the spaces between them. While as herein shown two diametrically opposed lugs are employed, it is to be understood that a greater or less number may be employed if desired. The lugs 23 herein shown, each extend through substantially a quadrant of arc, the space 24 separating such lugs being of substantially equal extent. As the outer surface of the lugs are substantial continuations of the cylindrical surfaces 18 they may be considered to form collectively a discontinuous cylindrical surface.

25 are circumferential grooves formed in the respective lugs 23, said grooves being in endwise alignment and preferably of substantially V form although under some circumstances square grooves may be employed. While as herein shown the inclined surfaces 26, 27 of these grooves are caused to axially intersect along apex line 28, it is to be understood that the term V groove is not necessarily limited to one in which the inclined surfaces actually meet, as it is intended to include a groove having inclined surfaces which would only meet at an imaginary line in space.

The grooves 25 are symmetrical as respects the line 28, and the angle between the sides is preferably substantially a right angle, although the exact angle is of no importance. The outer free extremities of the lugs 23 are provided with curved surfaces 29 the curvature of which is substantially like that of the surface 21, such surfaces being complemental one of the other.

Referring now to Figs. 5 and 6, 30 is a locking ring having an internal diameter such as to permit it to slip over and slide freely upon the cylindrical surface 18. At its left hand side, as seen in Figs. 2 and 5, said ring is provided with a pair of segmental inwardly extending flanges 31. These flanges in cross-section are of triangular form as clearly shown in Fig. 2. The left hand face of the flange 32 lies in the plane of the left hand end surface 33 of the ring, while the right hand surface 34 of said flange is inclined at substantially the same angle as the face 27 of the groove 25. The flanges 31 are of substantially the same arcuate length as the spaces 24 between the lugs 23, and in assembling the parts the ring 30 will be slipped over the end of the reduced cylindrical portion 18, being turned to a degree sufficient to permit the flanges 31 to pass between the lugs 23. The ring 30 is of an axial length such that when its right hand edge seats against the shoulder 19 the surface 33 of the flange will lie substantially in the plane of the surface 27 and when in such a position the ring may be rotated whereby to slide the flange 31 into the groove 25. It may be stated in this connection that the shoulder 19 is not necessary to the operation of the device but forms a convenient means of positioning the parts in assembling the same.

The ring 30 is provided with a circumferential slot 34ᵃ extending through the same and adapted to engage over a pin 35 having threaded engagement with an opening 36 formed in the reduced portion 18 of the body member. The screw 36 is inserted after the ring 30 has been placed in position with its flange in engagement with the groove 25 whereby the ring is retained in position,—the slot 34 permitting a partial rotation of the ring.

It being understood that the other of the conduit terminals is of a construction which is the duplicate of that just described and it being further remembered that the lugs 23, the spaces 24 between them and the flange 31 are of substantially equal arcuate lengths, it will be clear that by rotating the rings 30 the flanges 31 may be caused to lie within the grooves 25 without overlapping the ends of the same. With the parts in this position the lugs 23 of one terminal element may be inserted in the spaces between the lugs of the other terminal element, the surfaces 29 of one pair of lugs engaging the surfaces 21 of the opposite body member. With the parts in this position, the two pairs of lugs being in inmeshed relation, the discontinuous cylindrical surfaces of the two members combine to form a substantial continuous surface, and the grooves 25 combine to form a substantially continuous circumferential groove or channel.

If now with the parts in this position one of the rings be turned a part revolution as permitted by the slot 34, its flanges 31 which previously lay entirely within the grooves of its own lugs, will now be caused to over-lap the grooves of the next adjacent lugs, such lugs being carried by the other of the terminal elements. Such over-lapping of the flanges serves to prevent withdrawal of the lugs whereby the two terminals are locked in connected position. While as just described but one of the rings was moved, it is to be understood that in the usual operation both rings will be partially rotated, and as the rings are preferably arranged to be rotated in opposite directions their respective flanges will be caused to over-lap at both ends of said lugs, thus very securely locking the coupling elements in position of use. As the parts are illustrated herein it is only necessary to turn the rings an eighth revolution in opposite directions to secure such locking effect, and for unlocking and separating the parts a similar degree of movement is necessary.

In a modified form shown in Figs. 12 to 15, one wall of the V groove in the lugs is inclined in an axial direction as seen at 40, and the flange 41 carried by the locking ring 42 is provided with an inclined cam surface 43 at its advancing end. By this arrangement, upon rotation of the locking ring, the surface 43, coming into contact with the surface 40, by a cam action causes a longitudinal movement of the lug with which it engages and as the advancing end of said flange contacts with the surface of a lug carried by the opposite terminal element, it is clear that the latter will be forcibly drawn into contact with the terminal element upon which the locking ring is mounted. It is to be understood that this arrangement of parts is duplicated in the two terminals so that such wedging or camming action results in a very close contacting of the terminal elements simultaneously with their locking against disengagement.

In the arrangement shown in Figs. 18ᵃ to 18ᵈ inclusive the clamping ring 30ˣ is provided with internal radial flanges having inclined ends 31ʸ and inclined inner walls 31ᶻ. The outer faces 31ˣ of said flanges are not flush with the outer faces of the clamping rings as shown in Figs. 5 and 6 but are gradually inclined outwardly therefrom being flush therewith at one end as shown in Fig. 18ᶜ and outstanding therefrom at the opposite end as shown in Fig. 18ᵈ. With this arrangement it will be clear that upon engagement of the clamping rings and a relative rotation of the same the inclined faces 31ˣ will act as cams or wedges for forcing the rings in opposite directions axially.

In the modification shown in Figs. 16 to 19 inclusive, the locking rings 50, 51 respectively, which are shown developed in Figs. 16 and 17 are each provided with cam surfaces 52, such surfaces being formed on adjacent edges of the respective rings and being axially inclined in the same direction. In the employment of locking rings of this type it is necessary that the groove formed in the projecting lugs shall be of a width to provide clearance, whereby the rings may be permitted to have a slight axial movement. As shown in Figs. 18 and 19 the slot has a bottom surface 53 which is substantially cylindrical and side walls 54, 55 perpendicular thereto. This exact arrangement of the side walls, however, is not essential, as side walls inclined to the bottom of the slot serve equally well for the purpose intended, and such a slot having inclined side walls is regarded as falling within the definition of a V-shaped groove as above pointed out.

In order to permit the rings to move axially, the slots 56 therein which engage the limiting pins 57 are inclined in a direction substantially parallel to the cam surfaces 52. The rings 50, 51, are provided with locking flanges 58, 59 respectively similar to the flanges 31 of the before described structure illustrated in Fig. 5. With this arrangement of parts it will be readily understood that upon a partial rotation of the locking rings 50, 51 in opposite directions, the flanges 58, 59 will be brought into locking relation with the grooves carried by the projecting lugs, but during such movement the cam surfaces 52, reacting one against the other, serve to crowd the rings 50, 51 in opposite directions axially of the coupling, and as the flanges of each ring bear against one of the walls 54, 55 of the opposite terminal element such movement of the rings serves to draw said coupling elements into close contact simultaneously with the locking of the same. While as herein illustrated the cam surfaces 52 are formed upon oppositely rotatable rings it is evident that if under any circumstances but one such locking ring were employed, such ring might be provided with a cam surface such as hereinbefore described and a fixed co-operating cam might be mounted upon a suitable part of the other coupling element.

As a further modified means for locking the coupling elements together and for drawing them into close contact the device shown in Figures 20 to 22 may be employed, such device being particularly adapted for use in connecting very heavy or large conduits. Referring to these figures, 60 is a groove or channel formed in the circumferential surfaces of the outwardly projecting lugs of a coupling element 61, such groove being of substantially the form herein before described with reference to the structure shown in Fig. 3, and having inclined sides 62, 63. The coupling element 64 is also provided with similar grooves in outstanding lugs, such grooves when the parts are in position as shown in Fig. 20 aligning with the groove 60 and therewith forming a substantially continuous circular channel.

65 is a flexible ring herein shown as having the form of a flat strip of material bent to form a nearly complete circular arc. Upon one of the free ends of said member is secured a bracket 66 having pivotally secured therein a screw threaded rod 67 and upon the other end of said member 65 is mounted a second bracket 68, said latter bracket being bifurcated to form a radial slot 69 into which the rod 67 may be swung. The ring member 65 is provided at intervals with inwardly extending ribs 70 of substantial triangular form as shown in Fig. 22, the transverse section of said ribs being of substantially the same shape and size as a corresponding section of the groove 60. In the employment of the device above described the outstanding lugs of the coupling terminals 61, 64 will be placed in intermeshed relation as hereinbefore described with respect to the structure shown in Fig. 1, and the spring band 65 with its ribs 70 will then be sprung into position such that the ribs 70 engage within the groove 60 of the outstanding and intermeshed lugs. The rod 67 is then swung down into engagement with the slot 69 and by tightening the nut 171 upon the outer end of the rod 67, the band 65 together with the ribs 70 may be drawn into clamping relation to the respective sets of lugs. During such movement the inclined surfaces of the ribs 70, by engagement with the inclined faces 62, 63, of the groove 60 tend to draw the terminals 61, 64 into close contact with the grooves 60 in exact circumferential alignment, and thus simultaneously lock the terminals together while drawing them into close contact.

In couplings of this character it is desirable to provide for a very close and tight fit between the adjacent ends of the separable coupling elements to avoid leakage of fluid through the joint, and to this end it is common to provide packing rings between the coupling terminals. Under high pressure such packing rings fail to operate properly, and in order to secure improved results the arrangements shown in Figs. 23 to 25 would be provided. In Fig. 23 the terminal 79, having the end face 71 and the central bore 72, is formed with an angular interior groove 73 of which one wall 74 may if desired, be inclined inwardly and toward the face 71, such groove also having a cylindrical wall 75. 76 is a packing ring, washer, or gasket of rubber or other suitable material having its outer peripheral surface shaped to fit snugly within the groove 73. The inclined wall 74 serves to lock said ring against accidental displacement. When two coupling terminals, such as 79, are brought into endwise engagement, the rings 76 will be compressed and as the rings are supported by the wall 75 such compression tends to deflect the rings inwardly. When the fluid under pressure is admitted to the conduit it acts to move the deflected packing ring outwardly to initial position, but as the rings were deflected inwardly under compression such action of the fluid merely serves to further compress the rings whereby an exceedingly tight joint is formed between the ends of the separable coupling terminals.

In Fig. 25 the terminal 80 provided with a bore 81 has a groove 82 formed adjacent its free extremity 83, such groove also having an inclined wall 84. 85 is a packing ring of somewhat different form from that shown in Fig. 23 seated within the groove and bearing against the inclined wall 84. The action of the packing ring 85 under compression is substantially similar to that of the ring 76 before described.

In Fig. 26 a further and preferred arrangement of packing ring is disclosed, the coupling terminal 100 having the bore 100$^a$ being provided near its extremity with an enlargement 101 of the bore. This enlargement terminates at its inner end at a radial groove 102, the end face 100$^b$ of the coupling being substantially flat. Within the enlarged bore is seated a sleeve 103 of resilient material, said sleeve having radially extending flanges at opposite ends one of said flanges 104 being seated in the groove 102 and the other flange overlapping and resting against the end face 100ᵇ. When the two coupling terminals are intermeshed as illustrated in Fig. 24 the outstanding lugs provide a substantially continuous circular wall supporting the outer faces of the radial flanges 105, thus acting in substantially the same manner as the wall 75 of the coupling terminal shown in Fig. 23. The arrangement shown in Fig. 26 permits of securing the gasket member 103 with its flanges securely in position within the terminal without the necessity of weakening the latter by grooves closely adjacent its free extremity.

I claim:

1. In a coupling device, in combination a substantially cylindrical body member, an axial extension of smaller diameter at one end of said member, the peripheral surface of said extension being flared outwardly to provide a curved surface merging into the end face of said member, and a lug projecting from said member and to a point beyond said extension, said lug terminating in a curved surface complemental to the curved surface first named.

2. In a coupling device, in combination, a conduit terminal comprising a cylindrical body portion having an axial extension, said axial extension having a circumferential groove therein, a ring freely turnable upon said extension, and a radial flange extending inwardly from said ring and slidable in said groove, the outer face of said ring lying in a radial plane substantially bisecting the axial width of said groove.

3. In a device of the class described, a conduit terminal having a substantially cylindrical body portion provided with an end surface substantially perpendicular to its axis, a member carried by said terminal and provided with a single circumferential groove, a ring mounted for free rotation upon said terminal and an angular flange carried by said ring and slidable in said groove, one face of said flange lying substantially in the plane of said end surface.

4. In a device of the class described, in combination a conduit terminal having an end surface, and spaced members projecting beyond said surface and having formed therein sections of a discontinuous V groove, the apex of said groove lying substantially in the plane of said end surface.

5. In a coupling device, in combination, a conduit terminal, a member carried by said terminal and having a V shaped, circumferential groove therein, a ring mounted for free rotation upon said terminal, and a flange of triangular section carried by said ring and slidable in said groove.

6. In a coupling device, a conduit terminal having a substantially flat surface, a member carried by said terminal and having a V shaped circumferential groove therein, the apex of said groove lying substantially in the plane of said surface, a ring mounted for free rotation upon said terminal, and a flange of triangular section carried by said ring and slidable in said groove, said flange having one face thereof lying substantially in the plane of said flat surface.

7. In a coupling device, a terminal member of substantially cylindrical form provided with an end surface perpendicular to its axis, and a segmental lug projecting axially beyond said surface, said lug having a circumferential V groove therein, the apex of said groove lying substantially in the plane of said surface.

8. A separable coupling comprising a pair of like terminal members, each terminal member having a plurality of segmental lugs projecting from its end, the spaces between adjacent lugs being of substantially the same circumferential extent as the lugs, each lug having an end surface complemental to the surface of the terminal intermediate the lugs, the end surface of the lug of one terminal being adapted to fit against the complementary surface intermediate adjacent lugs of the other terminal, each lug having a single circumferentially extending groove in its outer surface, all of the grooves of both terminals being aligned when the terminals are engaged with one another, and a retaining ring disposed in said aligned grooves to hold the terminals in operative relation.

9. A separable coupling comprising a pair of like terminal members, each terminal member having a plurality of circumferentially spaced segmental lugs projecting from its end, the lugs and intervening spaces being of substantially equal circumferential extent, each lug having a curved end surface, the surface of the terminal members intermediate the lugs being complementary curved, the curved end face of the lugs of one terminal being adapted to fit snugly against the complementary curved faces of the other terminal, each lug of each terminal having a single circumferentially extending groove in its outer surface, all of the grooves of both terminals being aligned when the terminals are engaged with one another, and a retaining ring disposed in said aligned grooves to hold the terminals in operative relation.

10. A coupling having in combination a substantially cylindrical body member, an axial extension at one end of said member, said extension having a curved circumferential surface merging into the end surface of said member, and a pair of spaced, segmental lugs projecting from said member and to a point beyond the end of said extension, said lugs having their free extremities provided with surfaces curved complementally to said first named surface.

11. In a coupling of the class described, in combination, a pair of conduit terminals, a rotatable ring associated with each said terminal for engaging in locking contact with the other said terminal, said rings being so constructed and arranged as to react one against the other upon opposite rotation thereof whereby to draw said terminals into close contact.

12. In a coupling, in combination, a pair of conduit terminals, a rotatable locking ring mounted to turn freely upon each of said terminals, locking elements carried by the ring on each said terminal to engage in locking contact with the other said terminal, and axially inclined opposed cam surfaces formed upon the adjacent edges of said rings.

13. In a hose coupling, the combination with a body portion having segmental annular recesses in the end thereof forming a central boss and a central conduit opening between said recesses, segmental lugs projecting from said end longitudinally beyond said boss between said recesses and adapted to dovetail with similar lugs on a complementary coupling member, said projections having circumferential V-shaped locking grooves, and a locking ring provided with internal projections corresponding with the grooves in said lugs.

14. In a hose coupling the combination with a body portion having segmental annular recesses in the end thereof forming a central boss and a central conduit opening between said recesses, segmental lugs projecting from said end longitudinally beyond said boss between said recesses and adapted to dovetail with similar lugs on a complementary coupling member, said projections being provided with circumferential locking grooves, a locking ring provided with internal projections corresponding with the grooves in said lugs, the opposite end of said body portion having a cylindrical nipple through which said conduit opening passes uninterruptedly, an external flange surrounding said cylindrical projection and means for wedging a hose end between said cylindrical projection and said flange.

15. A hose coupling comprising a body portion, a cylindrical nipple extending from one end thereof, a flange concentric with said nipple, wedge shaped clamping members adapted to be forced into clamping position between said nipple and said flange, means to force said clamping members into clamping position between said flange and said nipple, symmetrical outwardly projecting segmental lugs on the other end of said body portion adapted to dovetail with lugs of similar shape on a complementary coupling member and having circumferential grooves provided with inwardly converging walls, a locking ring mounted for free rotation in said grooves and provided with radial projections having correspondingly converging surfaces adapted to engage the walls of said grooves, and a replaceable resilient bushing or gasket located about the conduit opening and between said lugs and adapted to be compressed between two coupling members when locked together.

Signed by me at New York, N. Y., this 21st day of July, 1920.

WILLIAM L. WALKER.